United States Patent [19]

Nelson et al.

[11] Patent Number: 5,577,252

[45] Date of Patent: Nov. 19, 1996

[54] METHODS AND APPARATUS FOR IMPLEMENTING SECURE NAME SERVERS IN AN OBJECT-ORIENTED SYSTEM

[75] Inventors: Michael N. Nelson, San Carlos; Sanjay R. Radia, Fremont; Graham Hamilton, Palo Alto, all of Calif.

[73] Assignee: Sun Microsystems, Inc., Mountain View, Calif.

[21] Appl. No.: 99,150

[22] Filed: Jul. 28, 1993

[51] Int. Cl.⁶ .................................................. G06F 13/00
[52] U.S. Cl. .................. 395/670; 395/200.16; 395/614; 364/284.3; 364/284.4; 364/DIG. 1
[58] Field of Search .................................. 395/700, 200, 395/600; 380/49; 364/284.3, 284.4, DIG. 1

[56] References Cited

U.S. PATENT DOCUMENTS 5,253,297  10/1993  Press .............................................. 380/49
5,377,323  12/1994  Vasudevan ................................. 395/200

OTHER PUBLICATIONS

Digital Equipment Corporation technical publication, Published Nov., 1988, Massachusetts, Entitled: DNA Naming Service Functional Specification (version 1.0.1).

*Primary Examiner*—Kevin A. Kriess
*Assistant Examiner*—Majid A. Banankhah
*Attorney, Agent, or Firm*—Blakely Sokoloff Taylor & Zafman

[57] ABSTRACT

A secure naming model for objects in an object-oriented system, wherein names are bound to objects within context objects. The context objects are implemented by name servers, and clients request that a context object "resolve" the name for the object. The name server that implements the context returns a duplicate of the desired object. If a name resolution involves more than one name server, an assurance of security is provided by the first name server to the second name server.

12 Claims, 19 Drawing Sheets

METHODS AND APPARATUS FOR IMPLEMENTING SECURE NAME SERVERS IN AN OBJECT-ORIENTED SYSTEM

BACKGROUND OF THE INVENTION

1. Field of the Invention

The present invention relates to the field of object-oriented programming. More particularly, the present invention relates to a secure naming model for objects in an object-oriented system.

2. Art Background

An object in an object-oriented system typically comprises a collection of data and a set of functions for manipulating the collection of data. The collection of data is referred to as state data for the object. The functions for manipulating the state data are referred to as operations. Each object corresponds to an object manager. The object manager is a server that performs the operations for the object and that maintains the state data in the object.

Typically, a client sends a message to the object to perform an operation. The message usually invokes one of the operations within the object. The message typically comprises an operation selector and a set of parameter data. The operation selector selects the operation within the object for manipulating of the object. The parameter data typically provides external information employed by the invoked operation. The operation usually returns a return value to the client after completion of the operation. The return value typically provides the results of the operation.

A naming service is usually employed to simplify access to objects in an object-oriented system. A naming service associates names to the objects within the system. The functions of a naming service are typically performed by one or more name servers. Each name server contains a list of name to object associations.

A client typically issues requests to a name server to resolve a requested name and return a duplicate of the object corresponding to the requested name. In a typical object-oriented system, each name server can create duplicates of the objects. As a consequence, the access to the name servers should be secure.

SUMMARY OF THE INVENTION

It is therefore an object of the present invention to provide a secure naming model for the objects in the object-oriented system.

The above and other objects are provided by a secure naming model for objects in an object-oriented system, wherein names are bound to objects within context objects. The context objects are implemented by name servers. A client requiring a named object requests that a context object "resolve" the name for the object. The name server that implements the context returns a duplicate of the desired object. If a name resolution involves more than one name server, an assurance of security is provided by the first name server to the second name server. The assurance is provided according to several methods. First, each of the name servers involved in the name resolution "trusts" the other named servers involved in the name resolution. Such a "trust" method requires no additional authentication. Alternatively, the assurance is provided by implementing context objects in name servers, such that the context objects encapsulate the same principal. Alternatively, the assurance is provided by aborting the name resolution and requiring the requesting client to authenticate itself.

BRIEF DESCRIPTION OF THE DRAWINGS

The objects, features, and advantages of the present invention will be apparent to one skilled in the art in view of the following detailed description in which.

NOTATION AND NOMENCLATURE

Figure 1:
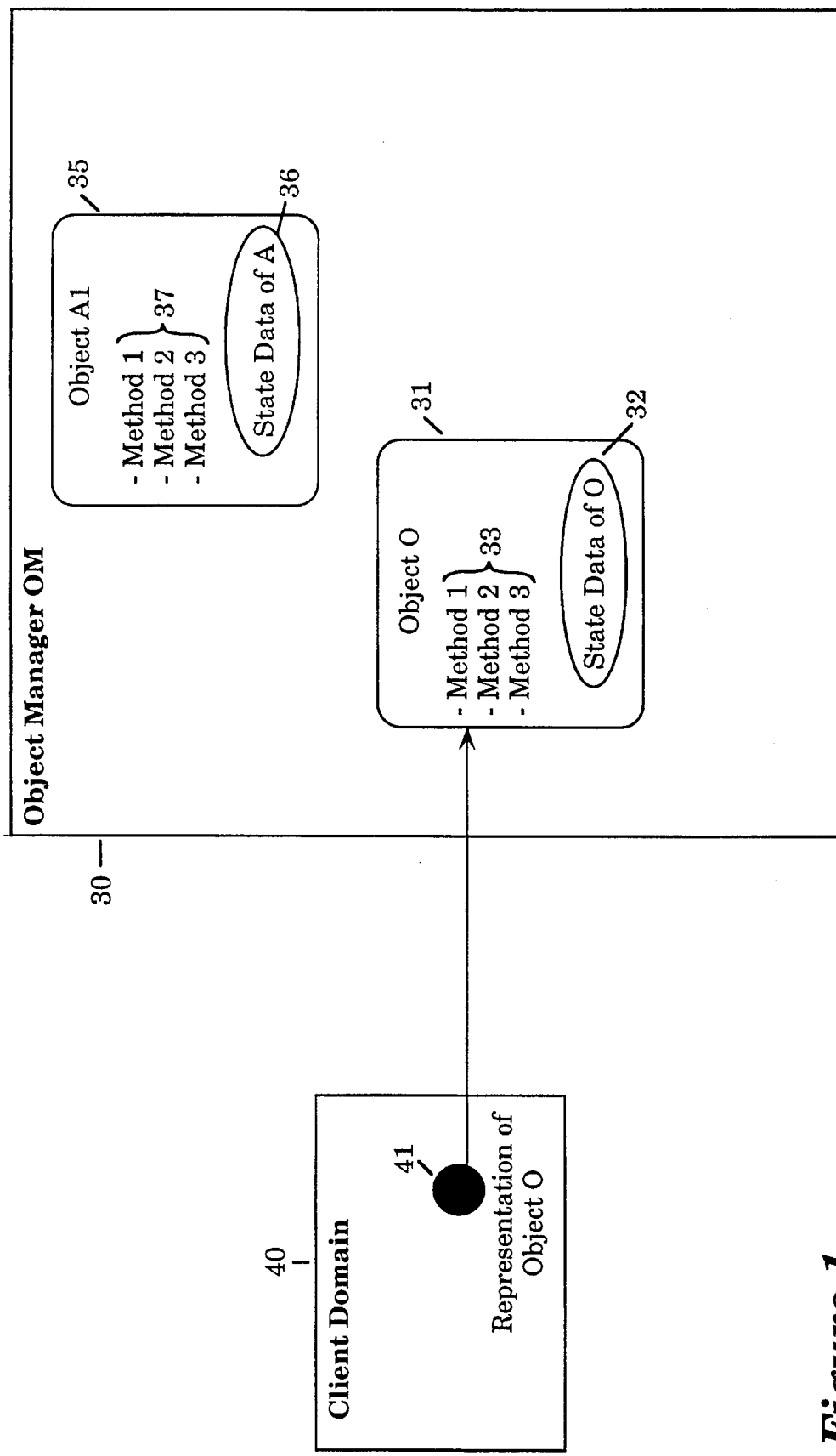
FIG. 1 is a block diagram illustration of a prior art representation of objects.

The detailed descriptions that follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

A method for providing a secure naming model for objects in an object-oriented system is disclosed. In the following description, for purposes of explanation, specific configurations of the system are set forth in a preferred embodiment in order to provide a thorough understanding of the present invention. The preferred embodiment described herein is implemented as a portion of the SPRING Object-Oriented Operating System created by Sun Microsystems®, Inc. (Sun Microsystems is a register trademark of Sun Microsystems, Inc.) However, it will be apparent to one skilled in the art that the present invention may be practiced without the specific details of the preferred embodiment. Moreover, it will be clear to those skilled in these arts that the present invention may be implemented in a non-object-oriented distributed computing system.

Object-oriented System Basics

An object-oriented system consists of a number of individual software "objects". Each object in the object-oriented system comprises a collection of data along with a set of functions that manipulate the collection of data in the object. The collection of data is referred to as the object's state data. The functions that manipulate the state data in the object are referred to as operations. Each object in the system has an object manager which is the server that implements the operations of the object and maintains the collection of data within the object.

For example, referring to FIG. 1, an object manager OM 30 is illustrated. Object manager OM 30 implements two objects: object O 31 and object A 35. Object O 31 and object A 35 each contain state data (32 and 36 respectively) and a set of operations used to manipulate the state data (33 and 37 respectively).

An object in an object-oriented system is used by "clients" of the object. The clients of an object manipulate the object by invoking the operations within the object or passing the object as a parameter in an operation on another object. Generally, the client of an object is unaware of the location or implementation of the object. To invoke an operation within an object or pass an object as a parameter, the client must have some representation of the object. The representation of the object provides all the necessary information to direct operations to the object. Ordinarily, the client of an object is unaware of the details of the representation of the object.

Referring back to FIG. 1, Client Domain 40 is a client of object O 31. To access object O 31, the Client Domain 40 has a representation 41 of object O. To invoke an operation within object O 31 or pass object O 31 as a parameter, Client Domain 40 uses the representation 41 of object O.

The SPRING Object Model

The SPRING operating system has a slightly different way of viewing objects than other distributed object-oriented systems. It is necessary to clarify these differences before disclosing the details of the present invention.

Figure 2A:
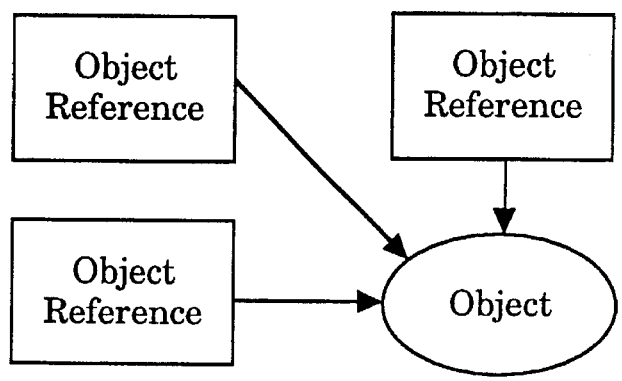
FIG. 2a is a block diagram illustration of a prior art implementation of multiple object handles referencing the same object.

Most distributed object-oriented systems present a model wherein objects reside at server machines and client machines possess object handles that point to the object at the server as illustrated in FIG. 2a. In such prior art systems, clients pass around object handles rather than objects.

Figure 2B:
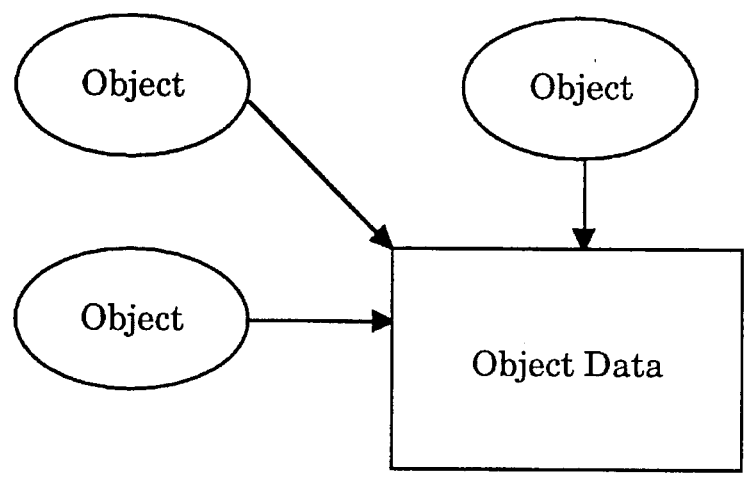
FIG. 2b is a block diagram illustration of the SPRING object model where several copies of an object reference the same state data.

Referring to FIG. 2b, the SPRING operating system present an object model wherein clients are operating directly on objects, not on object handles. In the SPRING system, an object can store its internal state remotely and the local state merely consists of a handle to the remote state. An object in the SPRING system can only exist in one place at a time. If more than one client need access to the same state data, then two objects are created that share the same state data.

Each object in the SPRING operating system may encapsulate a principal name. A principal name is a name that is a assigned to each user of the SPRING object-oriented system. The principal name encapsulated in an object is the name of the user that created the object. When an object with an encapsulated principal is acting as a client, the object uses the encapsulated principal to establish access rights.

Furthermore, each object in the SPRING operating system also encapsulates an access right. The encapsulated access right determines to what extent the object can read or manipulate its associated state data. For example, an object may be created with "read" access such that the object can read its associated state data but cannot change the associated state data.

Finally, the state data for an object may store an internal access control list (ACL). The internal access control list stores a list of principals that may access the object state and what access rights each principal has to the object state. For example, if an object allows the principal "srr" read access itself, then the object state may contain an internal access control list (ACL) indicating that "srr" has "read" access to the object. Internal access control lists are optional, so not all objects will have them.

Figure 3:
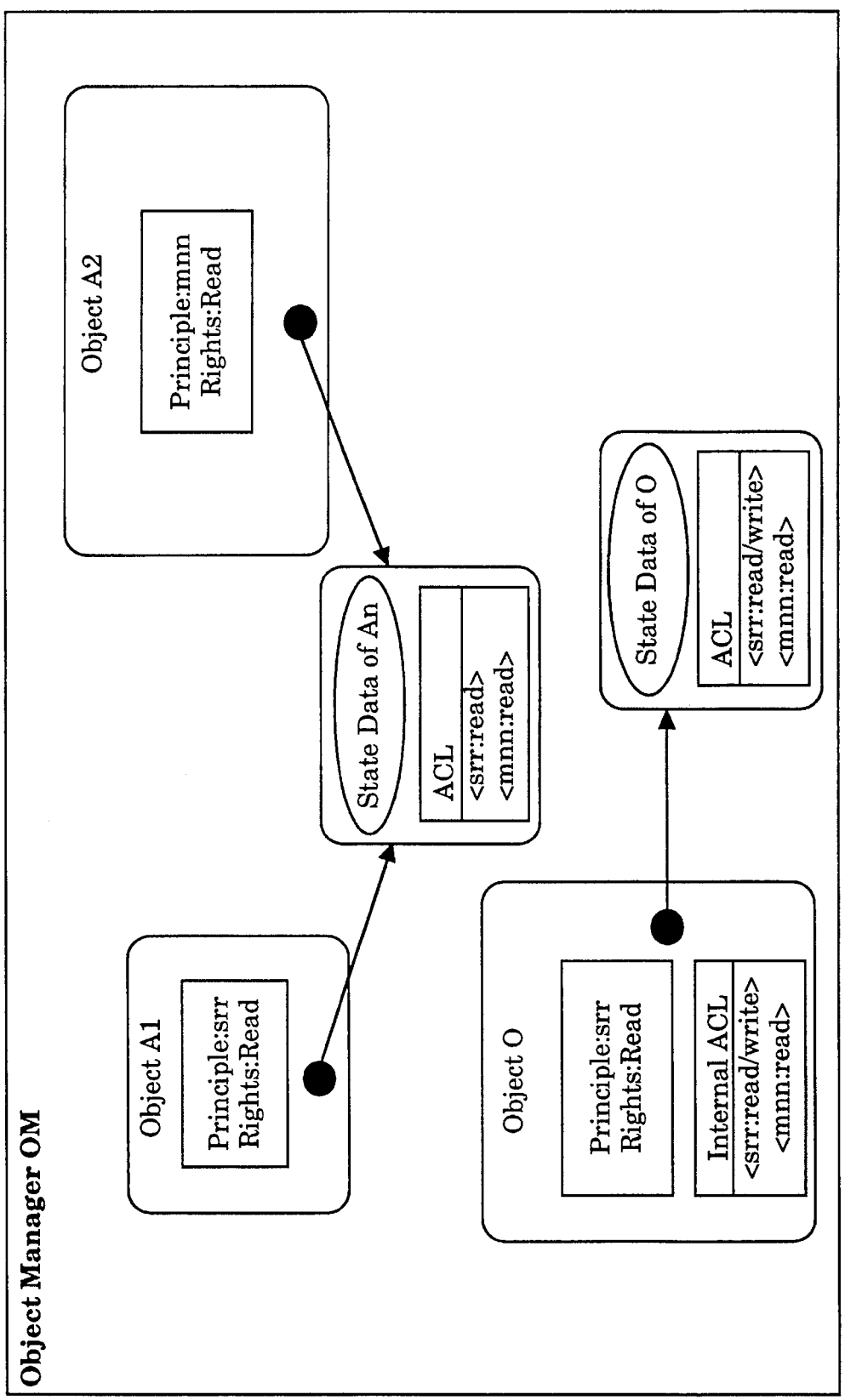
FIG. 3 is a block diagram illustration of three objects using the SPRING object model.

For example, FIG. 3 illustrates three objects implemented with the SPRING object model. Object A1 and Object A2 are two objects that share the same state data. Object A1 has an encapsulated principal of "srr" and "read" access rights. Object A2 has an encapsulated principal of "mnn" and "read" access rights. The state data for Objects A1 and A2 also has an internal access control list (ACL) that will allow both "srr" and "mnn" to create read-only copies of the object.

Object Naming

Each object in the SPRING object-oriented operating system can be given one or more names. Each name associated with an object usually consists of a string of printable characters. In the SPRING operating system, an object name is associated with an object within a "context" such that the object name is unique within the context. A context is an object that contains a list of name-to-object associations. Context objects are implemented in a special type of object manager referred to as a "name server". The process of assigning a name to an object within a context is referred to as "binding" the name to the object and the list of name-to-object associations is referred to as the binding list.

Figure 4:
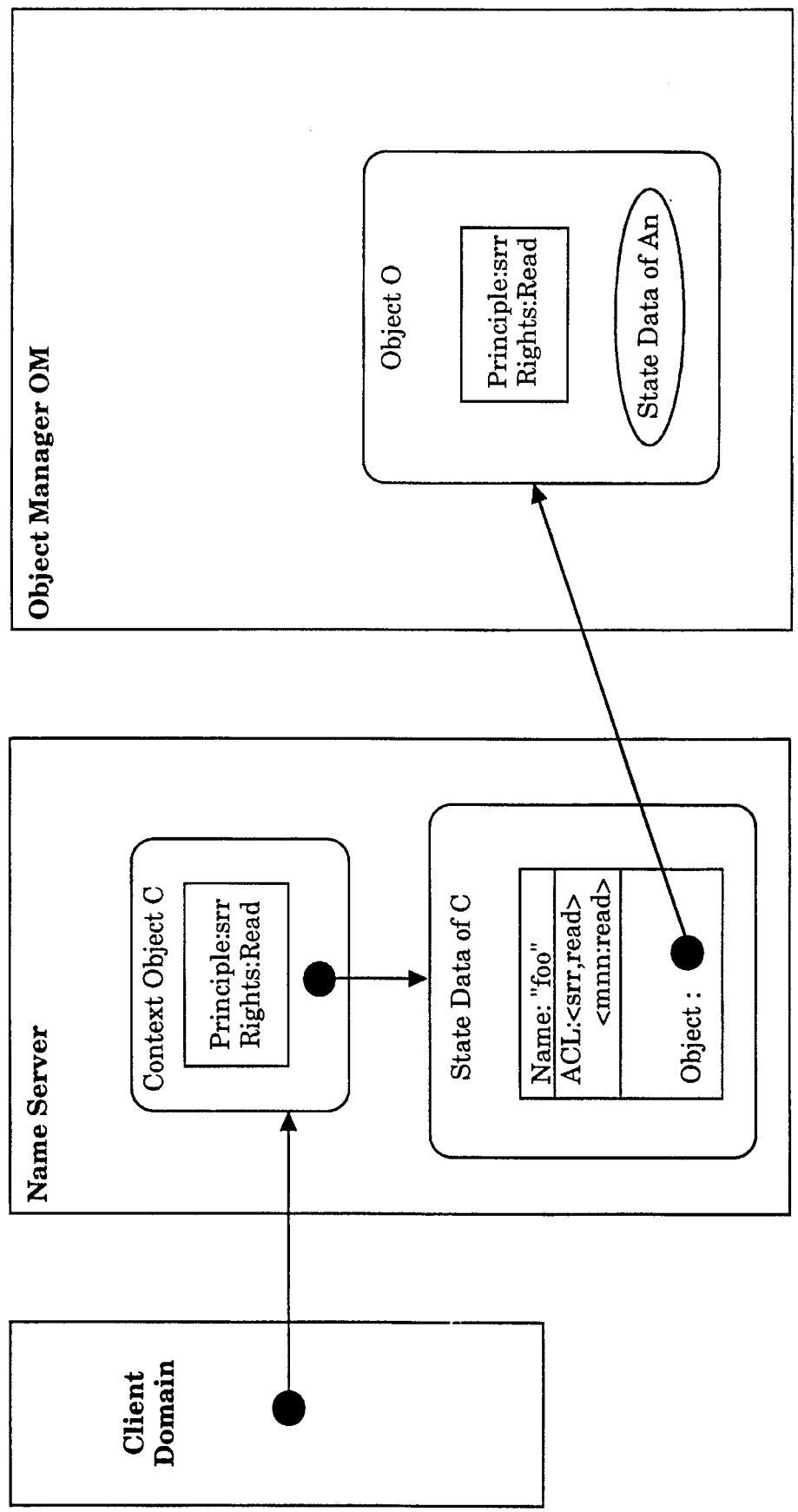
FIG. 4 is a block diagram illustration of a context object that binds an object to the name "foo".

For example, referring to FIG. 4, Object O is an object implemented in Object Manager OM. Context object C is a context object implemented within Name Server. Context object C contains an encapsulated principal "srr" and "read" access rights. Context object C refers to state data that contains a binding list. In FIG. 4, context C's binding list contains a single binding between the name "foo" and object O. Thus, within context C, object O is bound to the name "foo".

Along with the name-to-object association, each binding in a context also contains an access control list for the bound object. The access control list (ACL) stores a list of the principals that may access the bound object. The access control list (ACL) also stores the access rights each principal has to the bound object. When a client knows the name bound to a particular object and has the proper access rights, the client can access the bound object by "resolving" the name of the object within a context in a name server to obtain a representation of the object. The client requests the resolve operation by invoking a resolve operation within a context object. The resolve operation takes a name and a desired set of access rights. The name server that implements the context resolves the name using the encapsulated principal of the context object in which the resolve operation was invoked. After completing the resolve operation, the name server returns a copy of the object having the same principal as the context in which the resolve operation was invoked and encapsulating the desired access rights.

For example, referring again to FIG. 4, the client may desire read access to the object bound to the name "foo" within context C. To obtain the object, the client requests context C to resolve the object name "foo" by invoking the resolve operation in context C. The name server performs the resolve operation by first examining the access rights of context C to see if it is allowed to access the binding list. Since context C has "read" access, it is allowed to access the binding list. The name server then examines the binding list associated with context C to find the name "foo". Next, the name server checks the ACL for "foo" to determine if "srr" (the encapsulated principal of context C) is allowed access to the desired object. Since "srr" is allowed read access to the object, the name server will return a duplicate of object O to the client domain.

Figure 5:
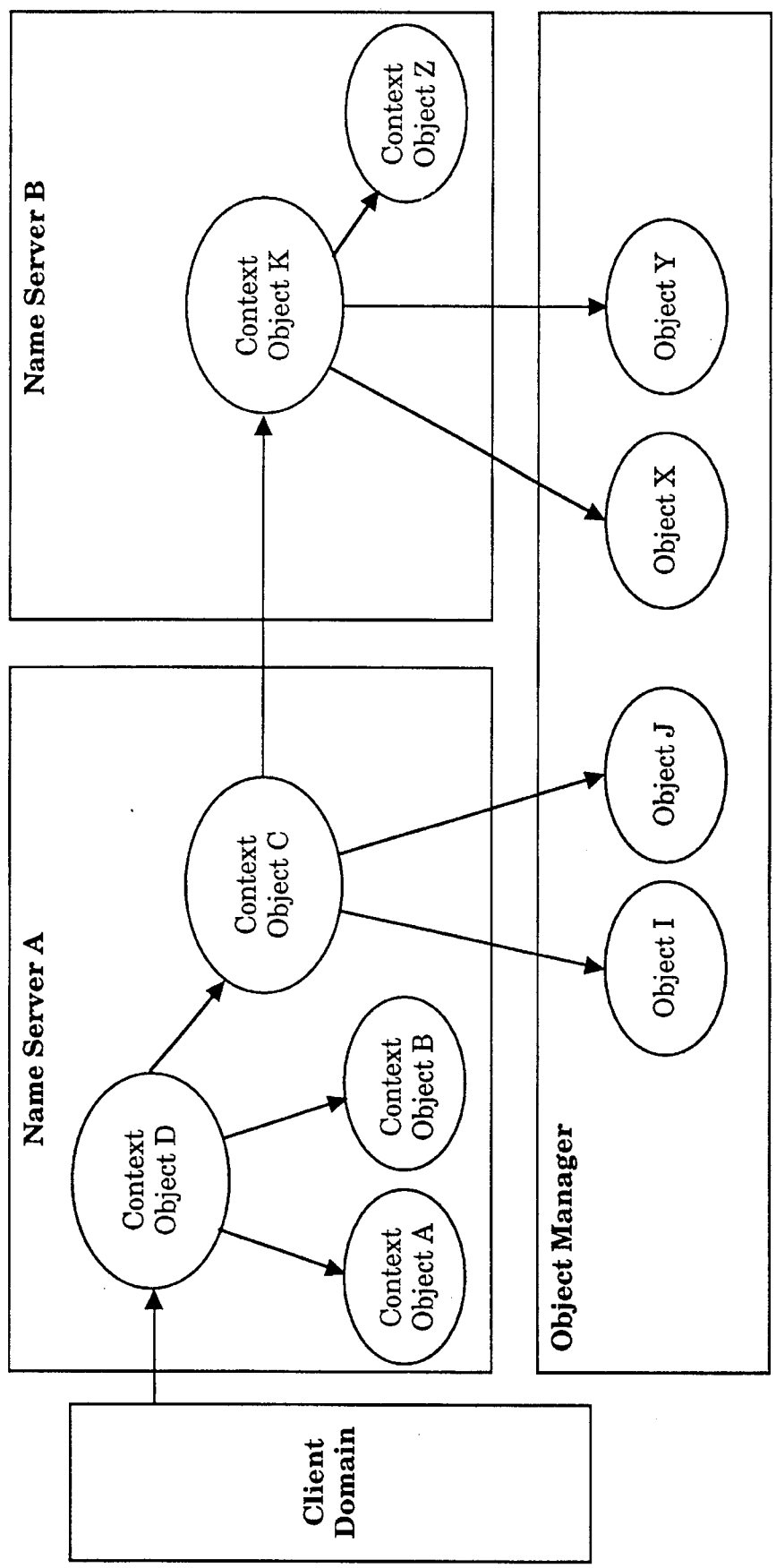
FIG. 5 is a block diagram illustration of several contexts that are bound to object names.

Context objects can themselves be bound within other contexts. In this manner a name "path" can be created. For example, referring to FIG. 5, a conceptual drawing of several contexts is illustrated. Illustrated within name server A of FIG. 5 is context D that contains bindings for objects named "A", "B", and "C". The object bound to the name "C" is another context object, context object C. Context object C contains bindings for objects named "I", "J", and "K". The object bound to the name "K" is yet another context object that is implemented in another name server. Context object K contains bindings for objects named "X", "Y", and "Z".

When a client wishes to access an object that is not directly available through a known context, the client can access the object by requesting a resolve operation in a known context and providing a path name that identifies the desired object. The name server that implements the known context recursively resolves the name using the encapsulated principal of the first context. When the resolution is complete, the name server returns a duplicate of the requested object that has the same encapsulated principal as the context object upon which the resolution was done and encapsulates the desired access rights.

For example, referring to FIG. 5, if the client wishes to access the object named "J", the client domain requests context D to resolve the name "C/J". Name server A processes the resolve request by first resolving the name "C" to obtain context object C and then resolving the name "J" within context C to obtain object J. The name server returns a duplicate of object J that has the same encapsulated principal of the original context object, context D.

Contexts can be bound within contexts implemented in other name servers. As illustrated in FIG. 5, context object K implemented by name server B is bound within context C. When a name resolution crosses a name server boundary, security must be taken into consideration.

A Secure Naming Model

To keep the system secure, name servers normally do not trust one another. Therefore, when a name resolution crosses from one name server to another name server, there must be some type of assurance that the system security is not being violated. For example, if a name resolution were to cross between name server A and name server B, name server B would require name server A to provide assurance that system security is not being breached. In the SPRING naming model, there are at least three ways to provide this assurance.

The first way of allowing a name resolution to cross name server boundaries is to set up a special connection where two name servers trust each other. When two name servers trust each other, no authentication is required when performing a name resolution that crosses the name server boundary. However, in most cases name servers do not trust one another.

The second way of allowing a name server to continue across a name server boundary is to have the original context and the context in the second name server have the same encapsulated principal. In this case, the name resolution is allowed to continue since the context in the second name server has the same access rights as the context in the original name server.

For example, if the client in FIG. 5 wishes to access the object named "X" then the client will request context D to resolve the path "C/K/X". If context D has the same encapsulated principal as context K, the name resolution will be allowed to cross the name server boundary and complete the name resolution. After completing the resolution, name server B will return a copy of object X that has the same encapsulated principal as context D.

If neither of the above two cases apply, the name server will abort the name resolution after it reaches the name server boundary. The name server aborts the resolution by raising a "cannot proceed" exception. When a name server raises a "cannot proceed" exception it also returns a powerless object (an object with no encapsulated principal or rights) that is a duplicate of the context in the second name server and the remaining path name. The client can then authenticate itself with the second name server in order to continue the name resolution. After authenticating itself with the second name server, the client requests the context object in the second name server to continue the resolve using the remaining path name.

To fully explain the secure naming model of the SPRING system, four name resolution examples are provided below. The four name resolution examples demonstrate four unique name resolution cases.

EXAMPLE 1

Entire Name Resolution Within a Single Name Server

Figure 6A:
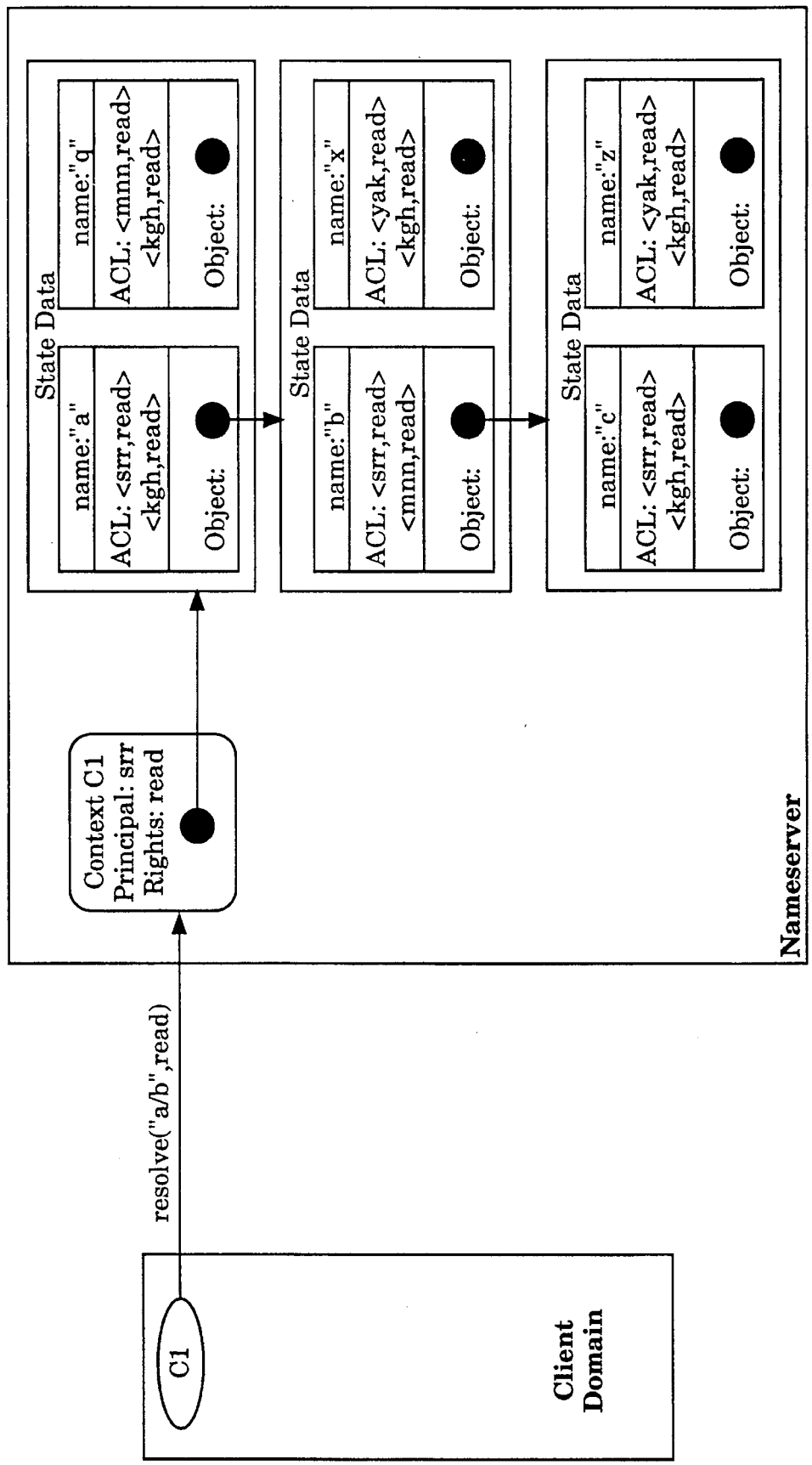
FIG. 6a is a block diagram illustration of a client requesting a name resolution within a single name server.
Figure 6B:
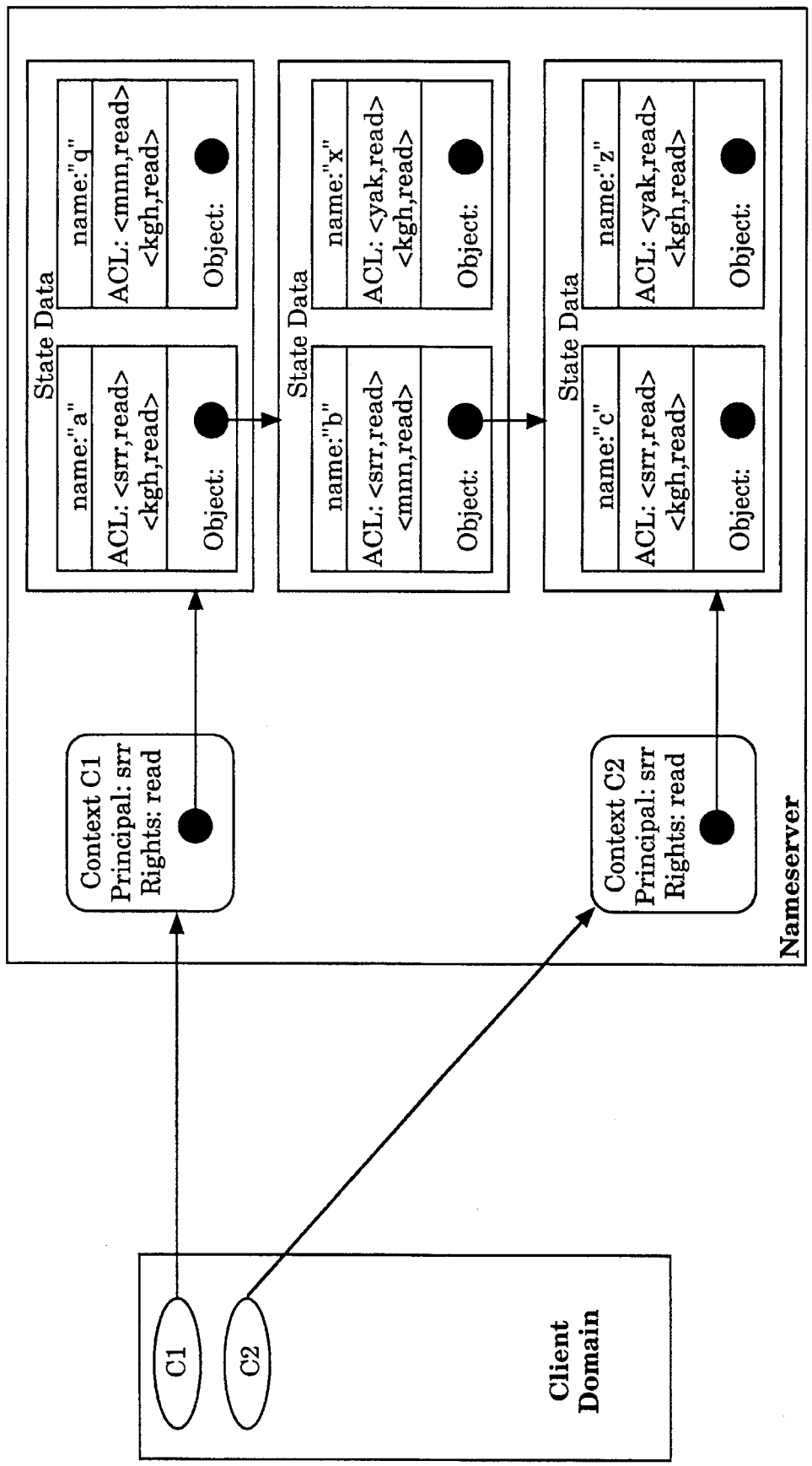
FIG. 6b is the block diagram illustration of FIG. 6a after the name resolution has been completed.

FIGS. 6a and 6b illustrate a first example of resolving a name within a context wherein the entire resolution process only requires a single name server. Referring to FIG. 6a, a client domain has a representation of a context C1 that is implemented by name server. Context C1 encapsulates the principal "srr" and the "read" access right.

In the first example, the client domain requests context C1 to resolve the path "a/b" and create an object with "read" access rights. Since context C1 encapsulates principal "srr", the principal "srr" will be used throughout the name resolution. The name server that implements context C1 first checks the access rights for context C1 to see if context C1 is permitted to read the associated state data. Since context C1 has "read" access rights, the name server proceeds to examine the binding list in the state data associated with context C1.

After determining that context C1 is allowed to access the binding list, the name server looks up the name component "a" in the binding list for context C1. As illustrated in FIG. 6a, the binding list for context C1 contains bindings for the names "a" and "q". Name server therefore accesses the binding for the name "a". The name server next checks the access control list (ACL) for the "a" binding to see if the context C1 is able to access the object "a". Since context C1 encapsulates the principal "srr", and "srr" is allowed read access to the object bound to the name "a", the name server accesses the object.

The name server discovers that the object bound to the name "a" is another context that is also implemented by itself. The name server therefore looks up the name component "b" in the binding list for the new context. As illustrated in FIG. 6a, the binding list for the new context contains bindings for the names "b" and "x". The name server checks the ACL on the binding to see if "srr" has the requested access (read, in this case) to the object bound to the name "b". Since the ACL on the binding gives "srr" read access, name server accesses the object. The name server discovers that the object bound to the name "b" is yet another context object.

Since "b" is the final component of the name to be resolved, name server A creates a duplicate of the context object that encapsulates the same principal and the original context (context C1), and encapsulates the read access right. The name server returns a duplicate object to the requesting client domain as illustrated in FIG. 6b where the context object C2 is the duplicated object.

If the object bound to the name "b" was not implemented in the name server, then the name server would have used a duplication service provided by an auxiliary service system to duplicate the object. (For example, the duplication service disclosed in the patent "Method and Apparatus For Providing Auxiliary Services in an Object-Oriented System", filed Jul. 20, 1993, Ser. No. 08/094,455, could be used to duplicate the object.)

EXAMPLE 2

A Name Resolution That Spans Multiple Name Servers

Figure 7A:
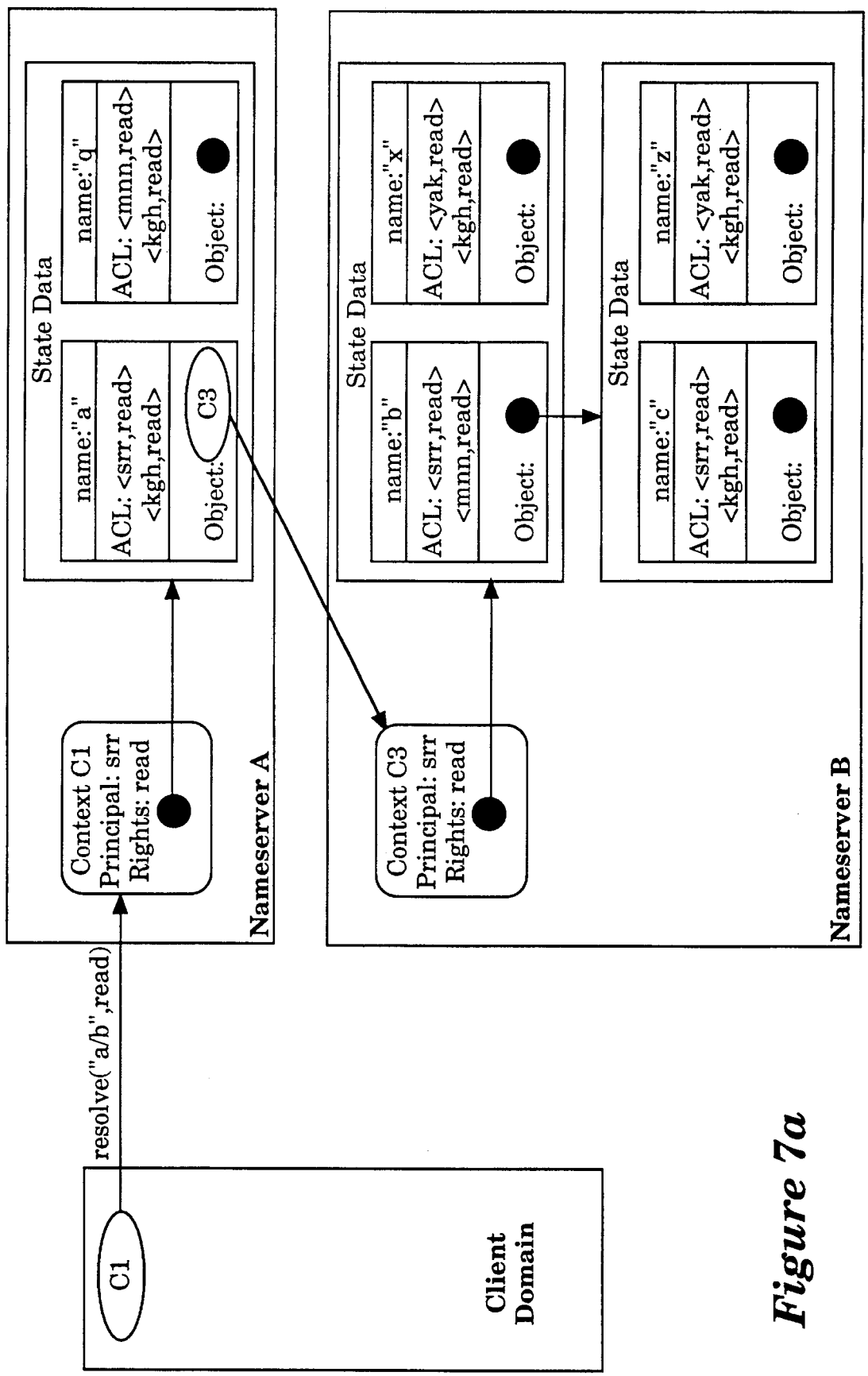
FIG. 7a is a block diagram illustration of a client requesting a name resolution across multiple name servers where both contexts needed have the same encapsulated principal.
Figure 7B:
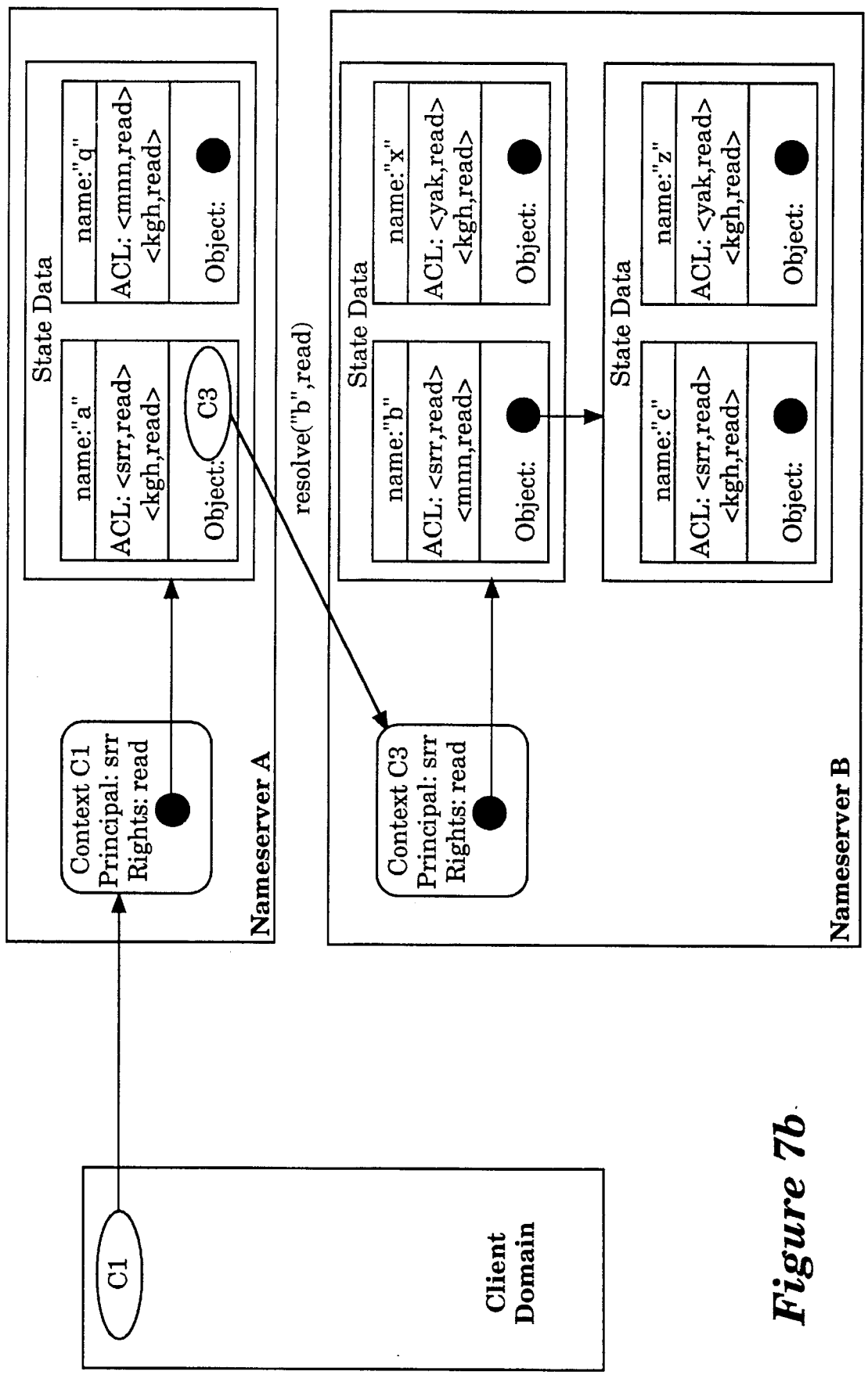
FIG. 7b is the block diagram illustration of FIG. 7a after the name resolution has been partially completed.
Figure 7C:
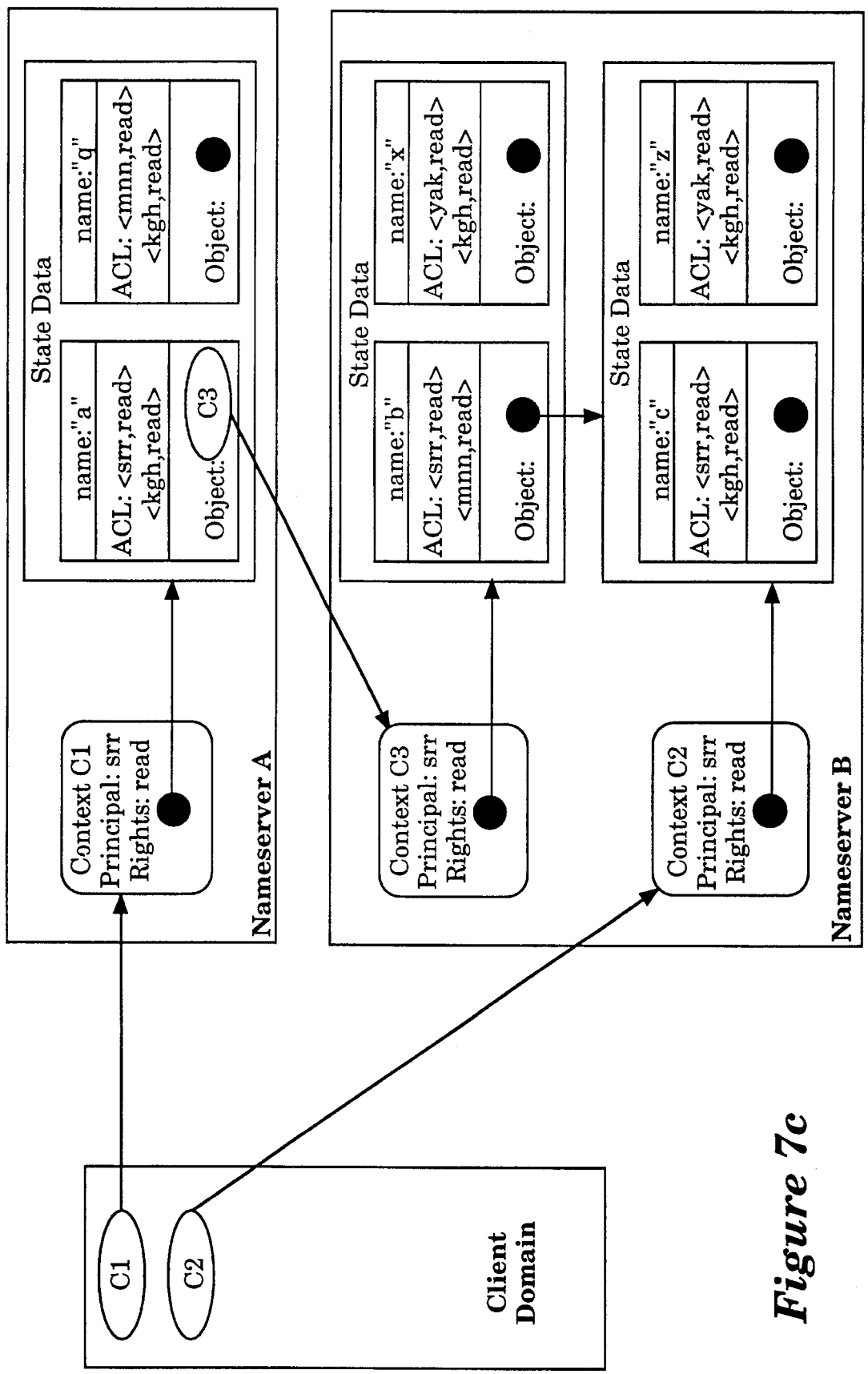
FIG. 7c is the block diagram illustration of FIG. 7a after the name resolution has been fully completed.

FIGS. 7a through 7c illustrate a second example of resolving a name wherein the path of name spans multiple contexts in multiple name servers. As illustrated in FIG. 7a, a client domain has a representation of a first context C1 that is implemented by a first name server, name server A. Context C1 encapsulates the principal "srr" and the "read" access right. A second name server, name server B, implements two additional context objects.

In the second example, the client domain requests context C1 to resolve the path "a/b" and create an object with "read" access rights. Since context C1 encapsulates principal "srr", the principal "srr" will be used throughout the name resolution. Name server A that implements context C1 first checks the access rights for context C1 to see if context C1 is permitted to read the binding list associated with context C1. Since context C1 has "read" access rights, the name server proceeds to examine the binding list associated with context C1.

The name server that implements context C1, name server A, searches the binding list for the name component "a". As illustrated in FIG. 7a, the binding list for context C1 contains bindings for the names "a" and "q". Therefore, name server A accesses the binding for the name "a" and checks the ACL to see if context C1 is allowed to access object "a". Since context C1 encapsulates the principal "srr" and the ACL states that "srr" is allowed read access to the object bound to the name "a", the name server accesses the bound object.

Upon accessing the bound object, name server A discovers that the object bound to the name "a" is a context object that is implemented by another name server. Specifically, the object bound to the name "a" is context C3 that is implemented by name server B. For the resolve operation to continue, the name servers must trust each other or context C3 must encapsulate the same principal as the original context. For the purposes of this example, assume that there is no trust relationship between name server A and name server B.

To find out the encapsulated principal of context C3, name server A invokes a "get_encapsulated_access" operation on context object C3. The "get_encapsulated_access" operation informs name server A that context C3 encapsulates the principal "srr" and the "read" access right. Since context C3 encapsulates the principal "srr" which is the same principal encapsulated by context C1, name server A continues the resolve operation by invoking the resolve operation on context C3 with the remaining name "b" as illustrated in FIG. 7b. Note that the resolve operation was only allowed to continue across the name server boundary since both the original context and the context in the second name server encapsulated the same principal.

Name server B, which implements context C3, receives the resolve operation and checks context C3 to see if context C3 has sufficient access rights. Since context C3 has read access, name server B looks up the name component "b" in the binding list for context C3. As illustrated in FIG. 7b, the binding list for the context C3 contains bindings for the names "b" and "x". Therefore, name server B checks the ACL on binding "b" to see if "srr" is allowed read access to the bound object. The ACL on the "b" binding gives "srr" read access to the object, so name server B accesses the object.

Name server B discovers that the object bound to the name "b" is context object implemented by itself. Since "b" was the final component of the name to be resolved, name server B creates a copy of the context object that encapsulates the same principal of the original context (context C3) and encapsulates read access. Finally, name server B returns a representation of the new object, context object C2, to the requesting client domain to complete the resolve operation as illustrated in FIG. 7c. As in the previous example, if the object bound to the name "b" was not implemented by the name server, then the name server would have used an appropriate duplication service to duplicate the object.

EXAMPLE 3

A Resolution That Spans Multiple Name Servers and Cannot Complete

Figure 8A:
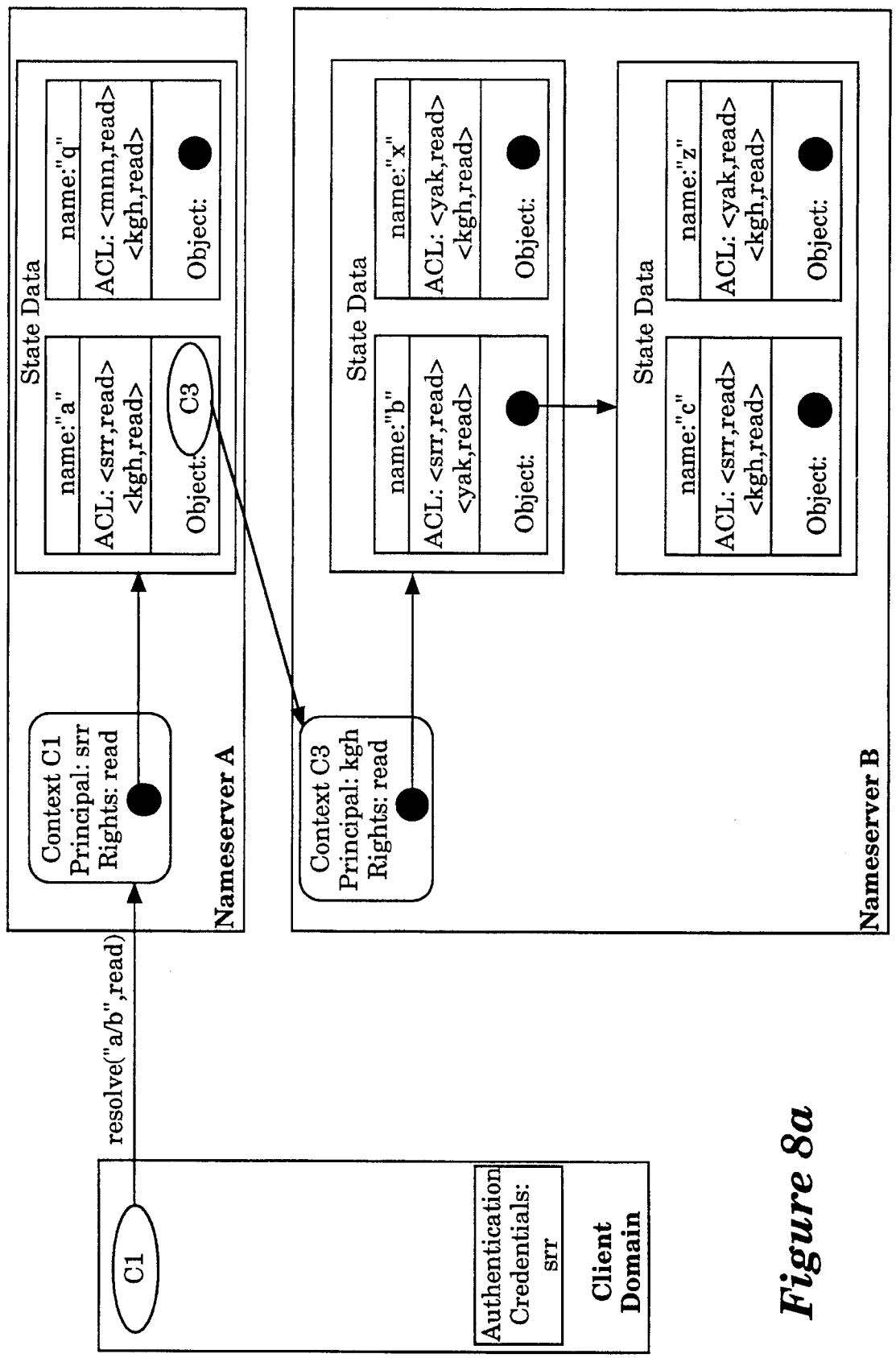
FIG. 8a is a block diagram illustration of a client requesting a name resolution across two name servers where the context in the second name server does not have the same encapsulated principal as the original context.

FIGS. 8a to 8e illustrate a third example of resolving a name that is similar to the preceding name resolution example. However, in this third example, the name resolution cannot complete since the name servers do not trust each other and contexts C1 and C3 encapsulate different principals. FIG. 8a illustrates a client domain that has the authentication credentials of "srr". The "srr" client domain has a representation of a first context C1 that is implemented by a first name server A. Context C1 encapsulates the principal "srr" and the "read" access right. A second name server, name server B, implements additional context objects including context C3 that encapsulates the principal "kgh".

In the third example name resolution, the client domain again requests context C1 to resolve the path "a/b" to obtain an object with "read" access rights. Name server A that implements context C1 first checks the access rights for context C1 to see if context C1 is permitted to read the state data associated with context C1. Since context C1 has "read" access rights, the name server proceeds to examine the binding list associated with context C1.

Name server A searches the binding list for an object bound to the name component "a". As illustrated in FIG. 8a, the binding list for context C1 contains bindings for the names "a" and "q". Accordingly, name server A accesses the binding for the name "a" and checks the binding's ACL to see if context C1 is allowed to access object "a". Since context C1 encapsulates the principal "srr", and the ACL states that "srr" is allowed read access to the object bound to the name "a", the name server accesses the bound object.

Figure 8B:
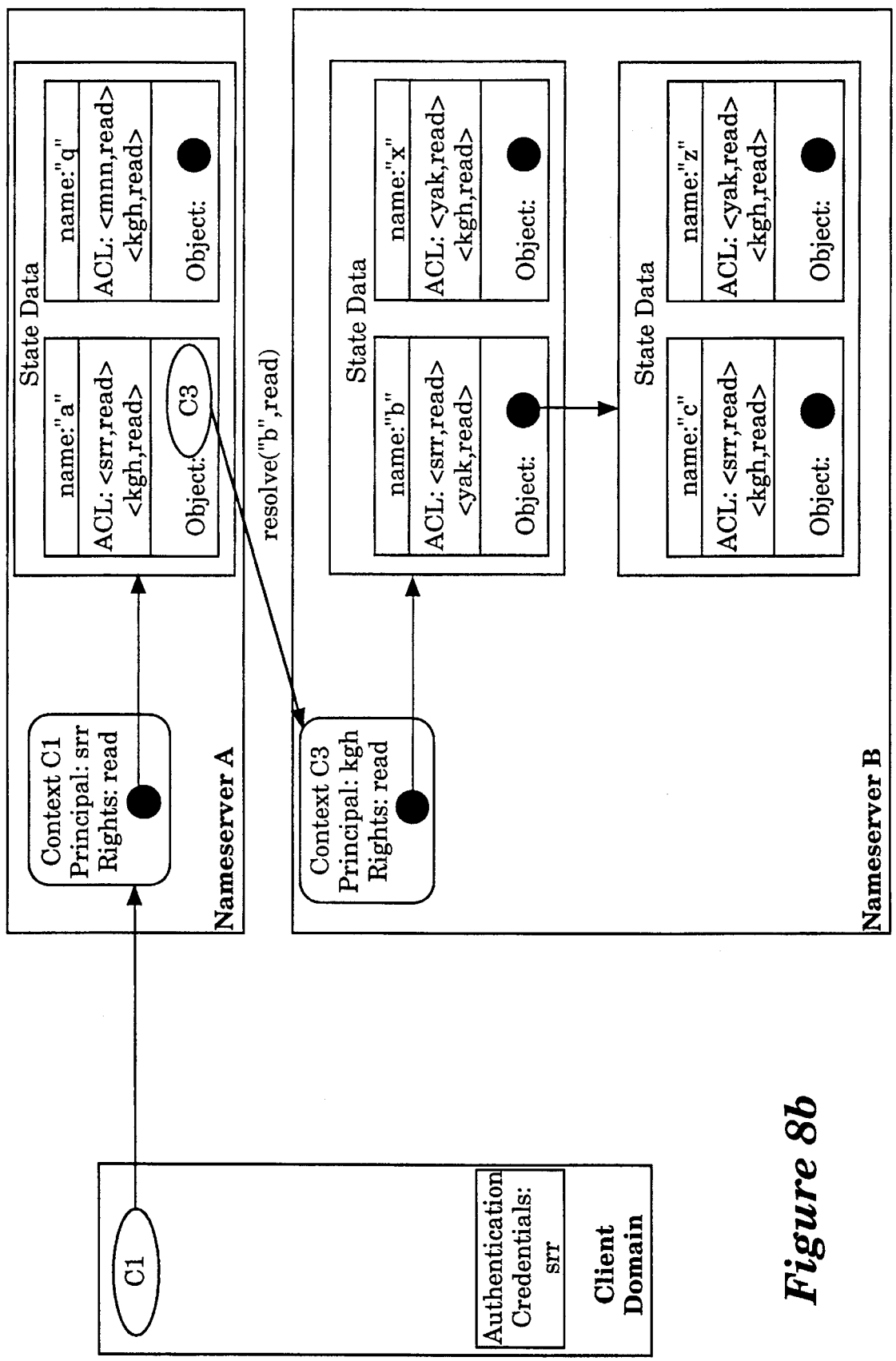
FIG. 8b is the block diagram illustration of FIG. 8a after the name resolution has been partially completed where an illegal resolve is being requested.

Name server A discovers that the object bound to the name "a" is a context object that is implemented by a second name server. Specifically, the object bound to the name "a" is context C3 that is implemented by name server B. For the resolve operation to continue, context C3 must encapsulate the same principal as the original context, context C1. To find out if the encapsulated principal of context C3 is the same as the original context, name server A invokes the "get_encapsulated_access" operation on context object C3. The "get_encapsulated_access" operation informs name server A that context C3 encapsulates the principal "kgh" and the "read" access right. Since context C3 encapsulates "kgh" and context C1 encapsulates "srr", there is not a match. Since the encapsulated principals do not match, name server A cannot continue with the name resolution. (If name server A was allowed to continue the name resolution, as illustrated in FIG. 8b, then it would be proceeding using the principal "kgh". Accordingly, this is not allowed.)

Again, if name server B and name server A had some special connection wherein name server B trusts name server A to act as the principal "srr", then the name resolution could have continued. However, for this example assume that name server B does not trust name server A.

Figure 8C:
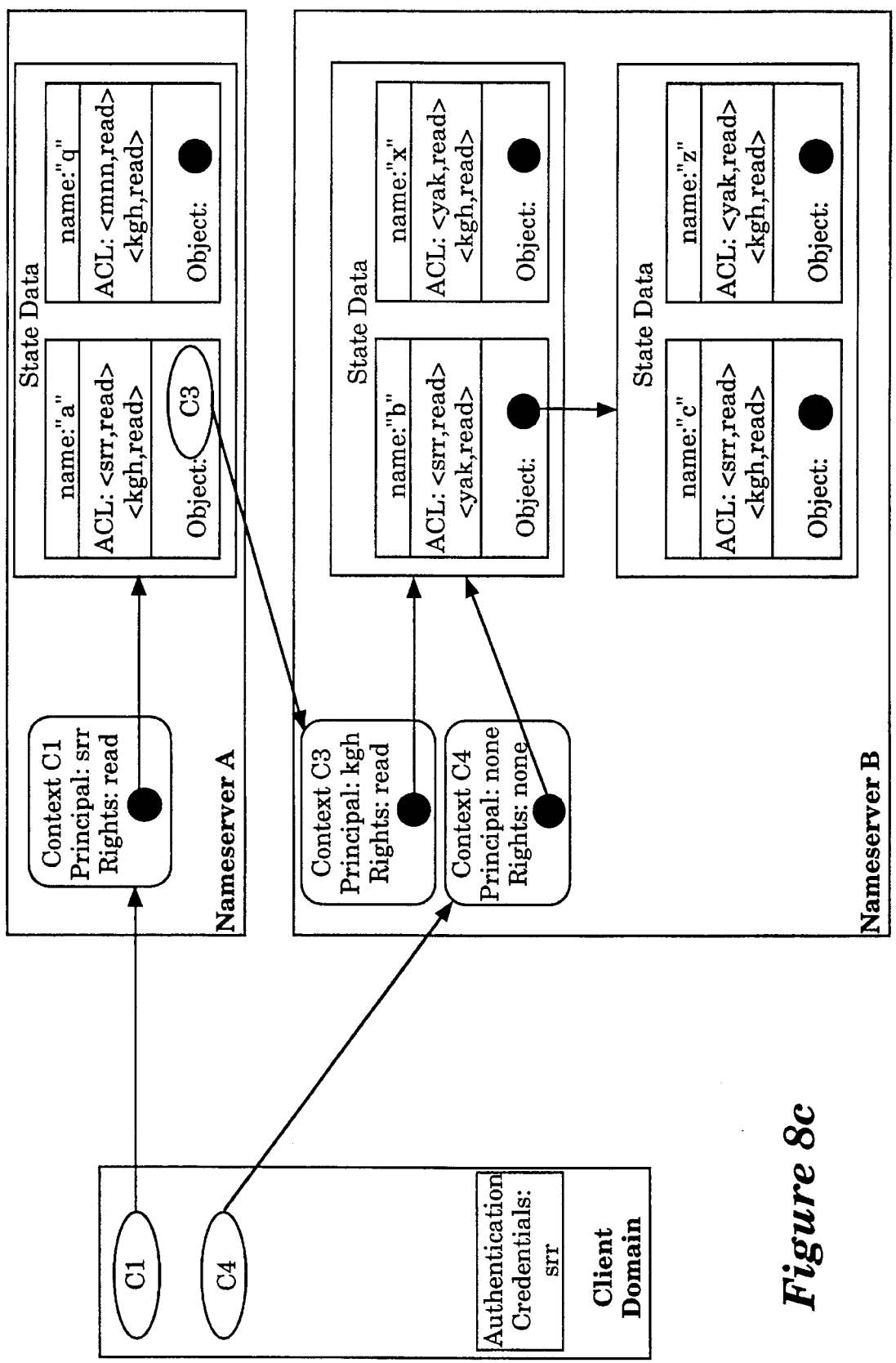
FIG. 8c is the block diagram illustration of FIG. 8a after the name resolution has been partially completed and a "cannot proceed" exception has been raised.

Since name server A cannot continue the name resolution, name server A raises a "cannot proceed" exception. When raising the "cannot proceed" exception, name server A returns a powerless context object, context C4, and the remaining path name "b" to the client domain as illustrated in FIG. 8c. The returned context C4 encapsulates no principal and no access rights. (The context C4 cannot be returned with encapsulated principal "kgh" since this would allow the client domain to act as "kgh").

Figure 8D:
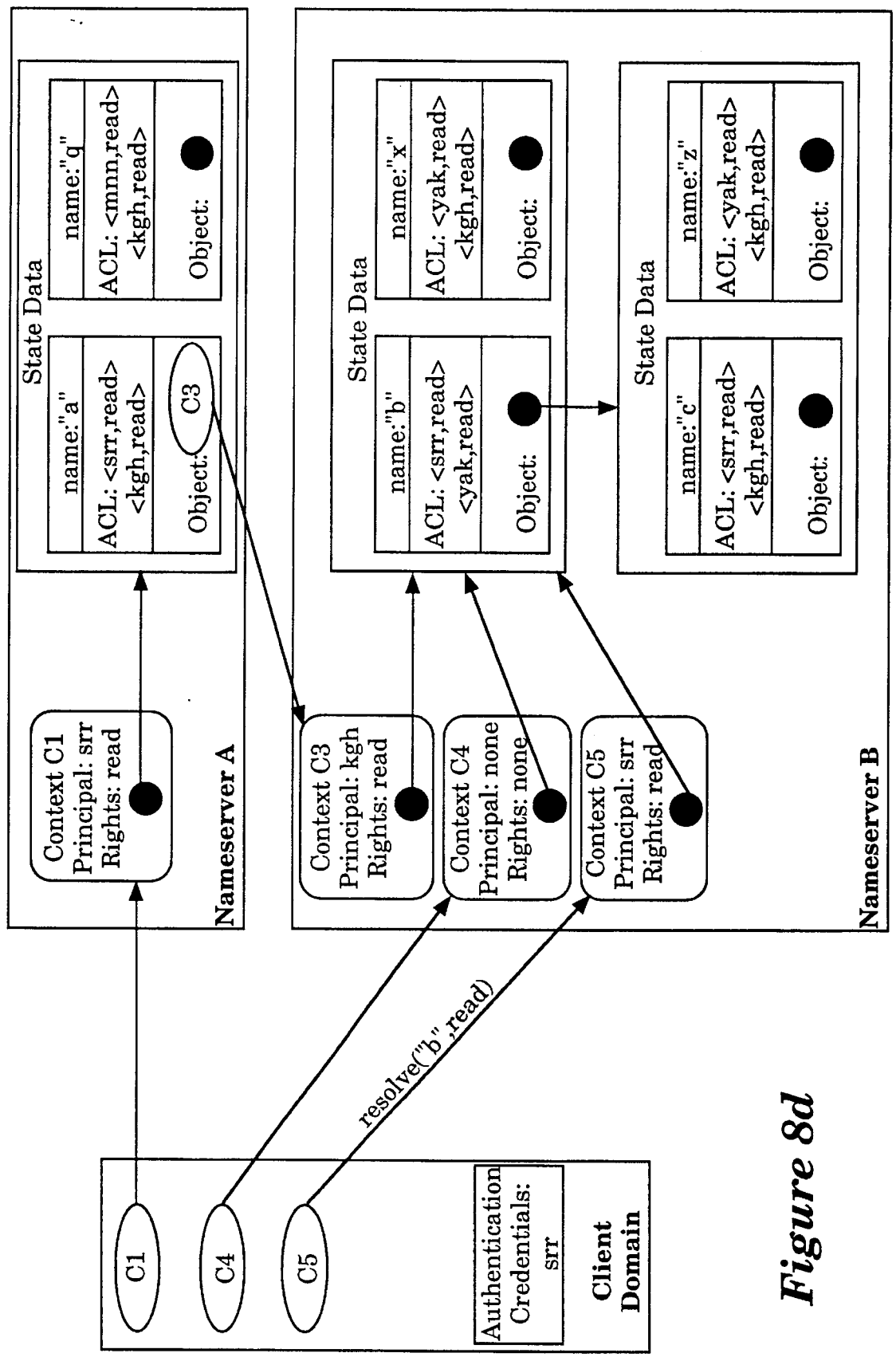
FIG. 8d is the block diagram illustration of FIG. 8a after the name resolution has been partially completed, the requesting client has authenticated itself with the second name server, and the requesting client has requested the second name server to complete the remainder of the resolve.

After receiving the "cannot proceed" exception, the client domain uses its credentials to authenticate itself as "srr" with name server B in order to continue the name resolution. After authenticating itself with name server B, the client domain requests a duplicate of context C4 with "read" access rights. The object manager for Context object C4 accesses an internal ACL to see if "srr" is allowed read access. Since the underlying object state allows read access to "srr", the object manager for C4 creates context C5 with encapsulated principal "srr" and "read" access as illustrated in FIG. 8d. The client can then continue the name resolution by invoking a name resolve operation on context C5 with the remaining name "b" as illustrated in FIG. 8d.

Name server B gets the resolve operation and checks context C5 to see context C5 has sufficient access rights. Since context C5 has "read" access, name server B looks up the name component "b" in the binding list for context C5. As illustrated in FIG. 8d, the binding list for the context C5 contains bindings for the names "b" and "x". Therefore, name server B checks the ACL for binding "b" to see if "srr" is allowed read access to the bound object. The ACL on the "b" binding gives "srr" read access to the object, so name server B accesses the object.

Figure 8E:
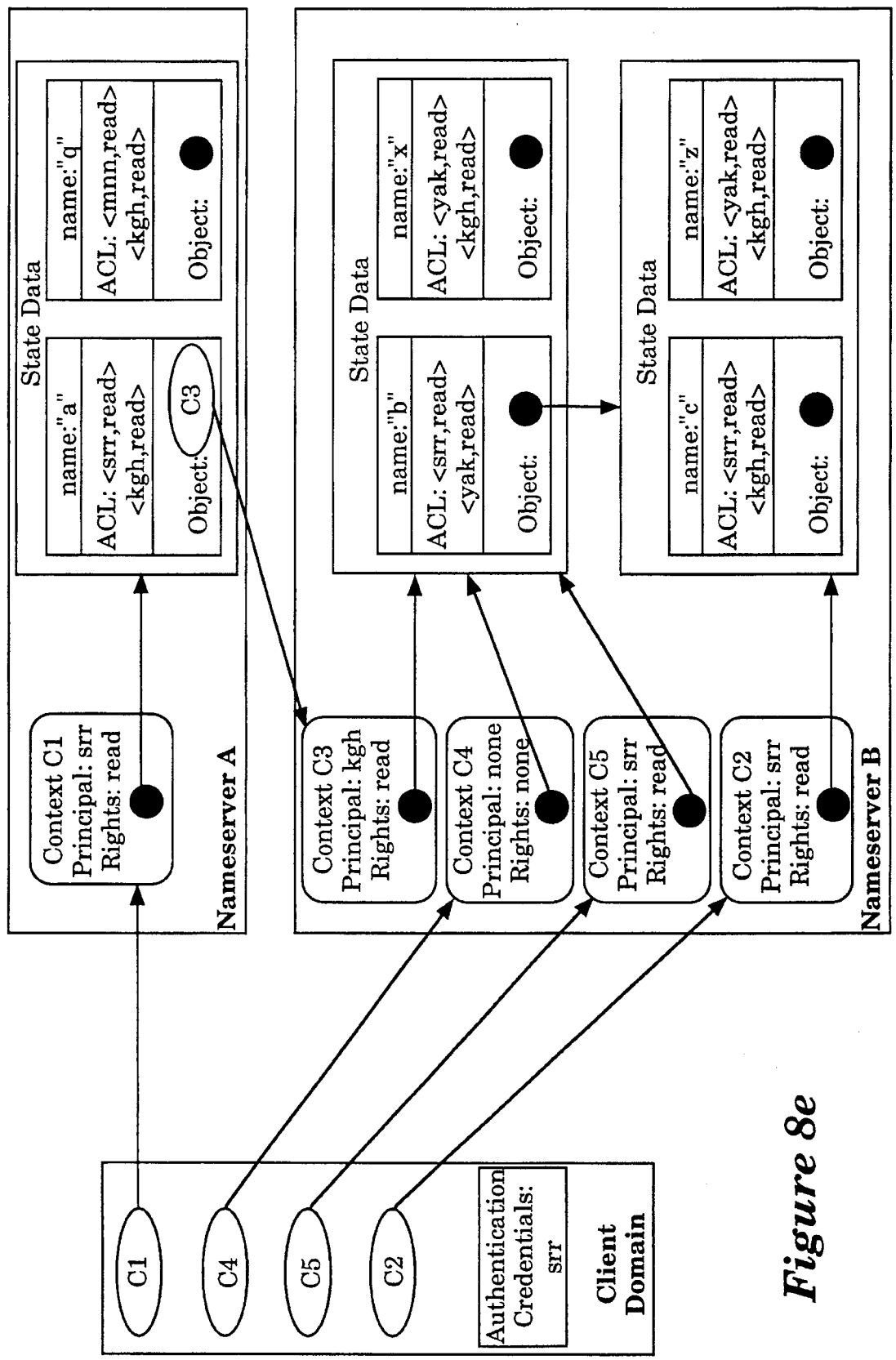
FIG. 8e is the block diagram illustration of FIG. 8a after the name resolution has been fully completed.

Name server B discovers that the object bound to the name "b" is another context object. Since "b" was the final component of the name to be resolved, name server B creates a copy of the context object that encapsulates the same principal of the original context (context C5 in this case) and encapsulates read access. Name server B then returns a representation of the new object (context object C2) to the requesting client domain as illustrated in FIG. 8e.

EXAMPLE 4

Multiple Name Servers, Cannot Proceed, and Different Principal

Figure 9A:
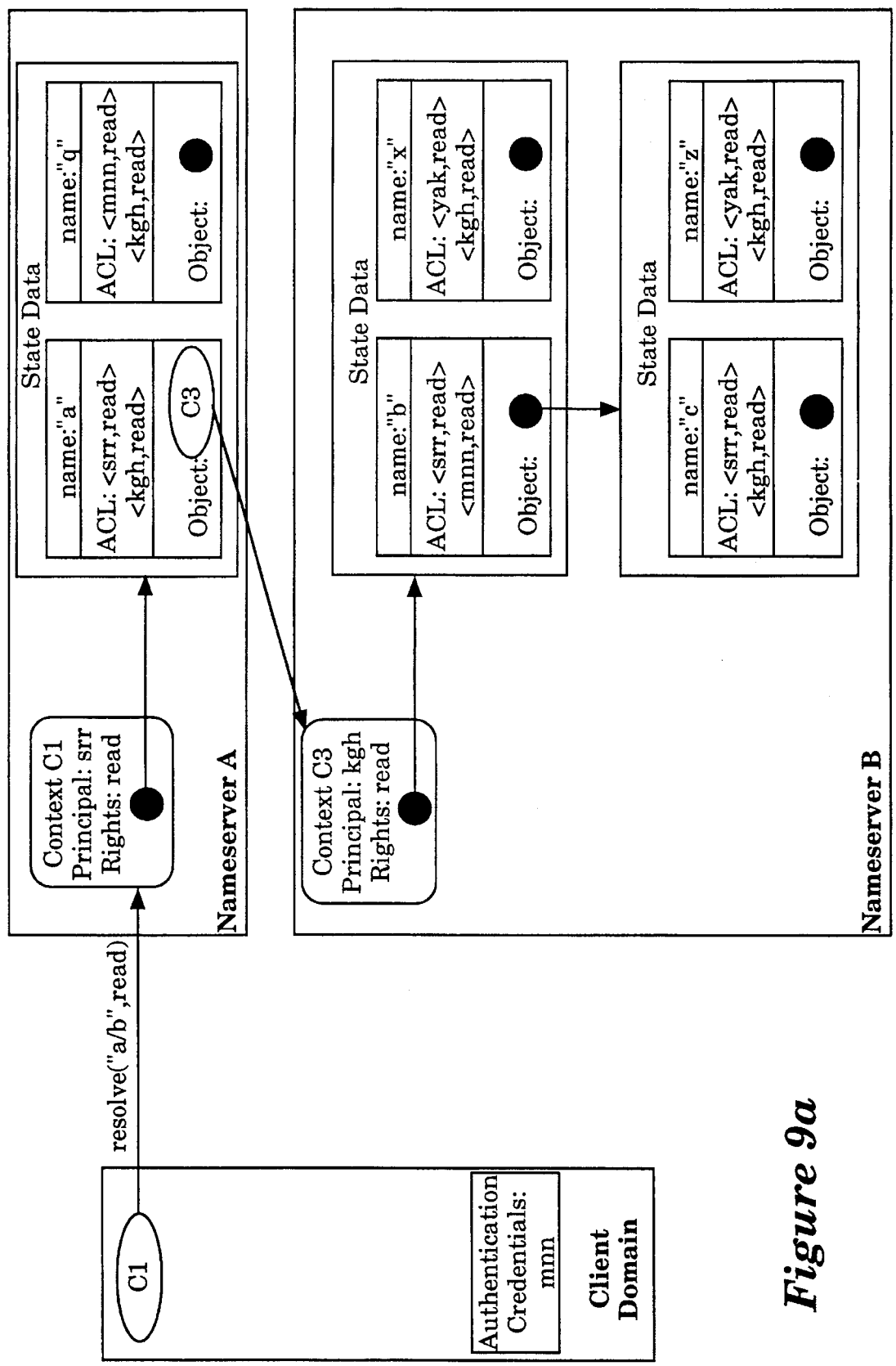
FIG. 9a is a block diagram illustration of a client requesting a name resolution across two name servers where the requesting client does not have the same encapsulated principal as the original context.
Figure 9B:
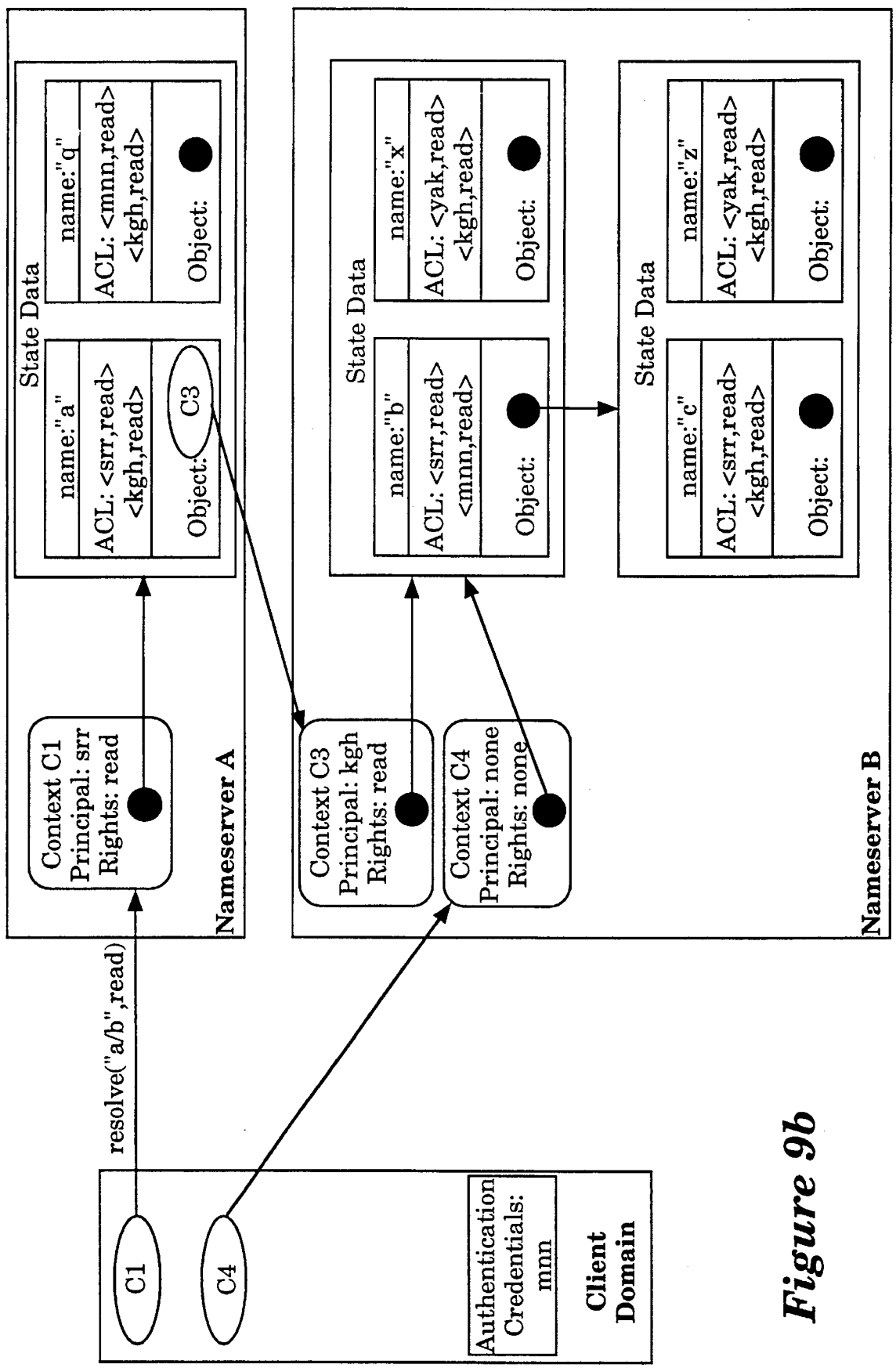
FIG. 9b is the block diagram illustration of FIG. 9a after the name resolution has been partially completed and a "cannot proceed" exception has been raised.

FIGS. 9a to 9d illustrate a fourth and final example of resolving a name that is similar to the preceding name resolution example. However, in this final example the client domain is requesting a resolution on a context received from another principal (the principal of the client domain and the encapsulated principal of the original context are not the same). FIG. 9a illustrates a client domain that has the authentication credentials of "mnn". The "mnn" client domain has a representation of a first context C1 that is implemented by a first name server A. Context C1 encapsulates the principal "srr" and the "read" access right. A second name server, name server B, implements additional context objects.

In this final example, the client domain requests context C1 to resolve the path "a/b" to obtain an object with "read" access rights. The name server that implements context C1, name server A, first checks the access rights for context C1 to see if context C1 is permitted to read the state data associated with context C1. Since context C1 has "read" access rights, the name server proceeds to examine the binding list associated with context C1.

Name server A that implements context C1 searches the binding list for the name component "a". As illustrated in FIG. 9a, the binding list for context C1 contains bindings for the names "a" and "q". Name server A therefore accesses the binding for the name "a" and checks the binding's ACL to see if context C1 is allowed to access object "a". Since context C1 encapsulates the principal "srr", and the ACL states that "srr" is allowed read access to the object bound to the name "a", the name server accesses the object.

Name server A discovers that the object bound to the name "a" in context C1 is a context object that is implemented by another name server. Specifically, the object bound to the name "a" is context C3 that is implemented by name server B. For the resolve operation to continue, context C3 must encapsulate the same principal as the original context, context C1. To find out if the encapsulated principal of context C3 is the same as the original context, name server A invokes the "get_encapsulated_access" operation on context object C3. The "get_encapsulated_access" operation informs name server A that context C3 encapsulates the principal "kgh" and the "read" access right. Since context C3 does not encapsulate the same principal as context C1, name server A cannot continue with the name resolution.

If name server B and name server A have some special connection wherein name server B trusts name server A to act as the principal "srr", then the name resolution could continue. However, in this example assume that name server B does not trust name server A.

Figure 9C:
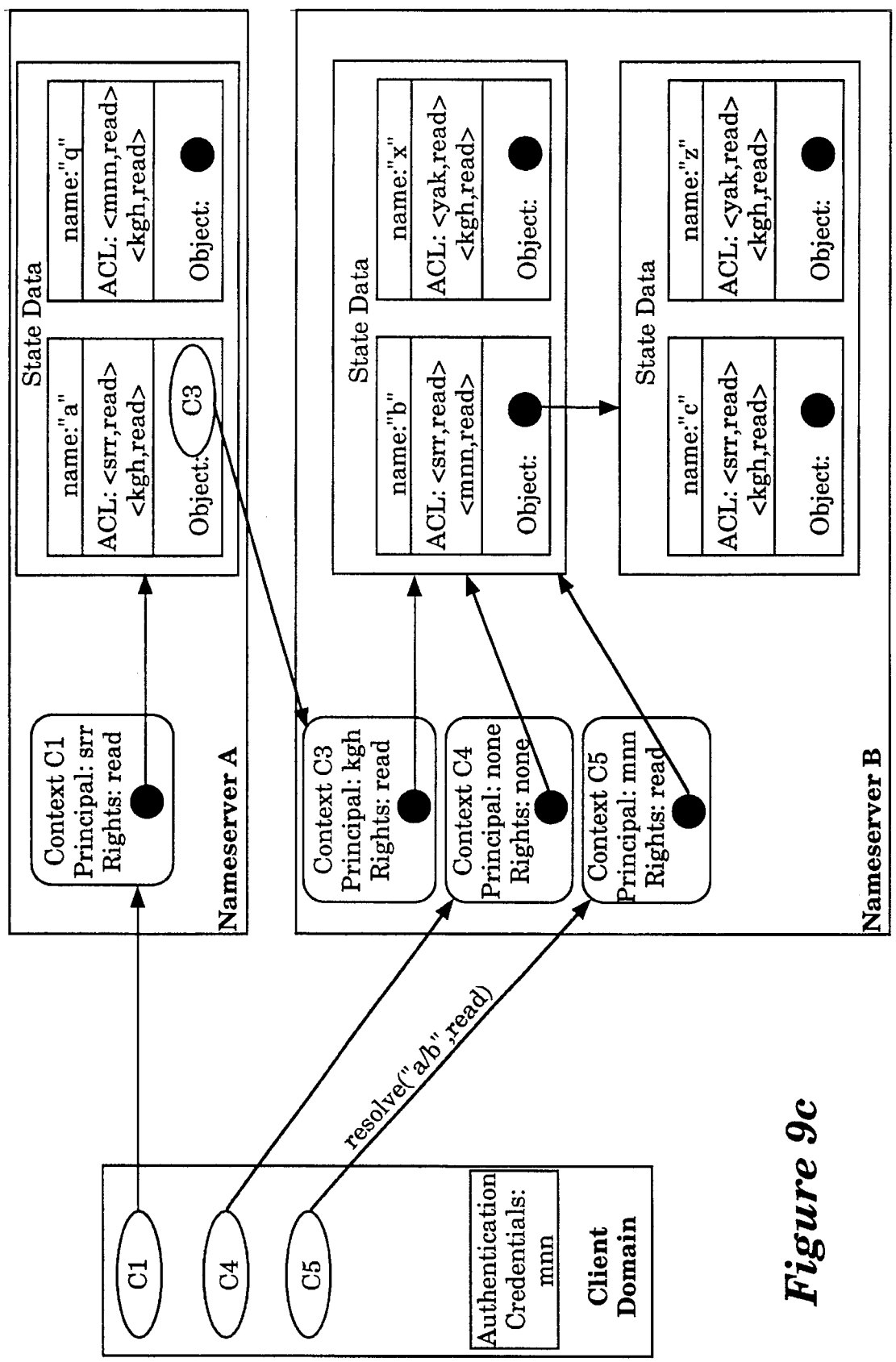
FIG. 9c is the block diagram illustration of FIG. 9a after the name resolution has been partially completed, the requesting client has authenticated itself with the second name server using its credentials, and the requesting client has requested the second name server to complete the remainder of the resolve.

Since name server A cannot continue the name resolution, name server A raises a "cannot proceed" exception. When name server A raises the "cannot proceed" exception, it returns a context C4 and the remaining name "b" to the client domain as illustrated in FIG. 9c. The returned context C4 points to the encapsulates no principal and no access rights. (Context C4 cannot be returned with encapsulated principal "kgh" since this would allow the client domain to act as the principal "kgh").

The client domain receives the "cannot proceed" exception and uses its credentials to authenticate itself as "mnn" with name server B. After authenticating itself, the client domain requests a duplicate of context C4 with "read" access rights. The object manager for Context C4 examines an internal ACL for the underlying state to see if "mnn" has read access to the object. Since the internal ACL indicates that "mnn" does have read access, the object manager creates context C5 with an encapsulated principal of "mnn" and "read" access rights as illustrated in FIG. 9c. The client can then continue the name resolution by involing a name resolve operation on context C5 with the remaining name "b" as illustrated in FIG. 9c.

Name server B gets the resolve operation and checks context C5 to see context C5 has sufficient access rights. Since context C5 has "read" access, name server B looks up the name component "b" in the binding list for context C5. As illustrated in FIG. 9c, the binding list for the context C5 contains bindings for the names "b" and "x". Therefore, name server B checks the ACL for binding "b" to see if "mnn" is allowed access to the bound object. The ACL on the "b" binding gives "mnn" read access to the bound object, so name server B accesses the bound object.

Figure 9D:
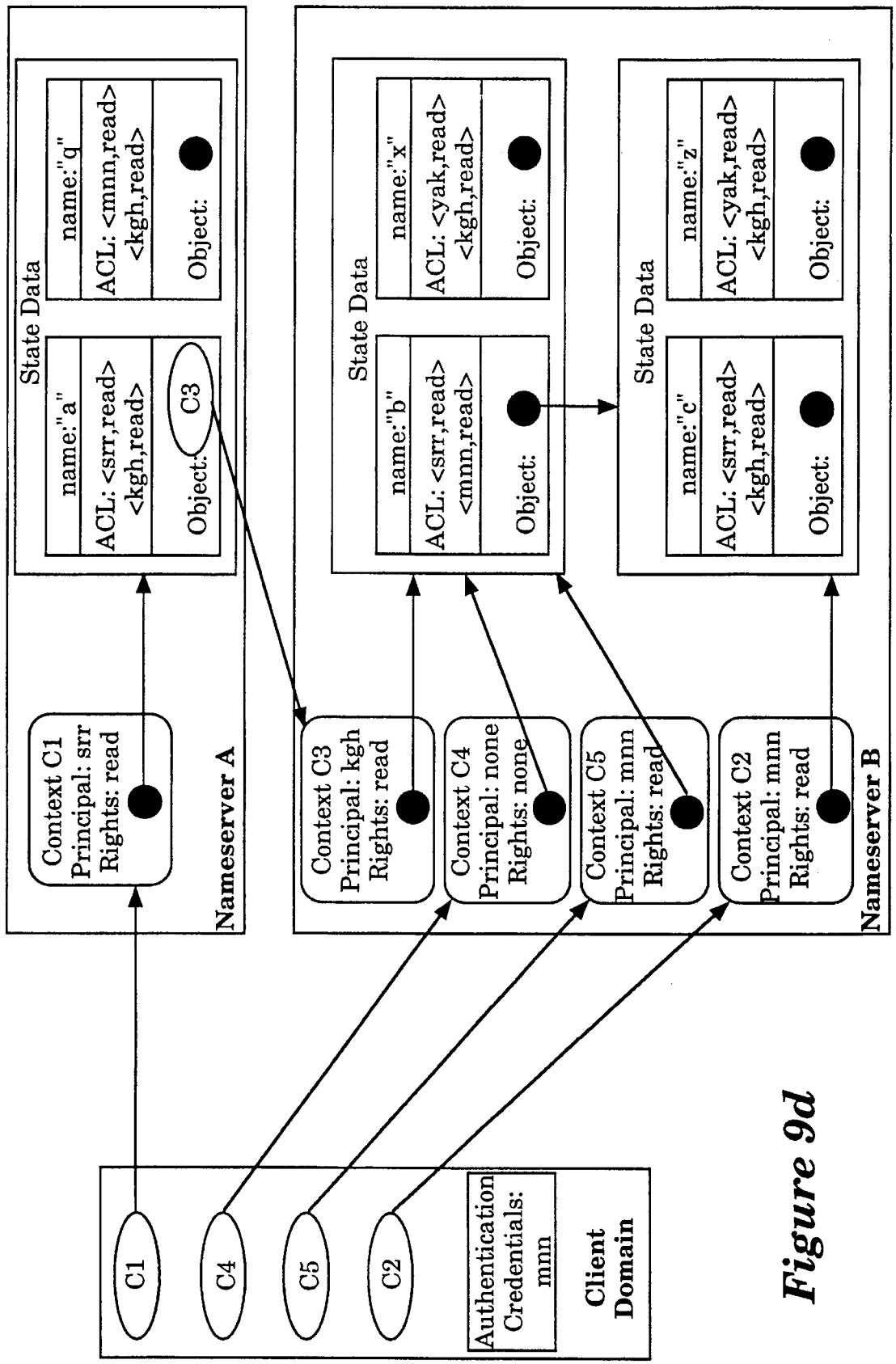
FIG. 9d is a block diagram illustration of FIG. 9a after the name server returns a representation of the context object to the requesting client domain.

Name server B discovers that the object bound to the name "b" is another context object. Since "b" was the final component of the name to be resolved, name server B creates a copy of the context object that encapsulates the same principal of the context that performed the resolve and encapsulates the read access rights. In this case, context C5 with the encapsulated principal "mnn" performed the resolve so name server B creates a duplicate object (context object C2) with the encapsulated principal "mnn". Name server B then returns a representation of context object C2 to the requesting "mnn" client domain as illustrated in FIG. 9d. As demonstrated in example 4, even though the client domain attempts a name resolution using a context object with encapsulated principal "srr", the final object received from an untrusting name server encapsulated the correct principal "mnn".

Although the present invention has been described with reference to the Figures, it will be apparent to one skilled in the art that the present invention has utility far exceeding that disclosed in the figures. It is contemplated that many changes and modifications may be made, by one of ordinary skill in the art, without departing from the spirit and scope of the invention as disclosed herein.

What is claimed is:

1. A computer implemented method for providing a secure naming system for a set of objects in an object-oriented system having a plurality of name servers, said method comprising the steps of:

implementing a first context object in a first name server, said first context object comprising a first encapsulated principal identifier and at least one name binding, each of said name bindings comprising a name and an object;

implementing a second context object in a second name server, said second context object comprising a second encapsulated principal identifier and at least one name binding, each of said name bindings comprising a name and an object;

binding said second context object to a second context name within said first context object;

binding a desired first object to a first object name within said second context object;

requesting said desired first object for a client using a path name comprised of said second context name and said first object name and a desired set of access rights; and resolving said request for said desired first object by performing the steps of resolving said second context name to receive a representation of said second context object located in said second name server;

assuring said second name server that a name resolution from said first name server to said second name server is secure;

resolving said first object name within said second context object to receive a duplicate of said desired object that encapsulates the first encapsulated principal identifier and the desired access rights.

2. The method of claim 1, wherein said step of assuring said second name server that a name resolution from said first name server to said second name server is secure comprises the steps of:

comparing said first encapsulated principal identifier in said first context object with said second encapsulated principal identifier in said second context object; and granting assurance if said first encapsulated principal identifier and said second encapsulated principal identifier are equal.

3. The method of claim 1, wherein said step of assuring said second name server that a name resolution from said first name server to said second name server is secure comprises the step of providing a special relationship between said first name server and said second name server such that said second name server trusts said first name server.

4. The method of claim 1, wherein said step of assuring said second name server that a name resolution from said first name server to said second name server is secure comprises the steps of:

raising a "cannot proceed" exception with said client;

returning a powerless duplicate of said second context object and said first object name to said client; and authenticating said client with said second name server.

5. An apparatus for providing a secure naming system for a set of objects in an object-oriented system having a plurality of name servers, comprising:

a first name server, said first name server having at least one context object, each of said context objects having an encapsulated principal identifier;

a first context object within said first name server, said first context object comprising a first encapsulated principal identifier and at least one name binding, each of said name bindings comprising a name and an object;

a second name server, said second name server having at least one context object, each of said context objects having an encapsulated principal identifier;

a second context object within said second name server, said second context object comprising a second encapsulated principal identifier and at least one name binding, each of said name bindings comprising a name and an object;

means for binding said second context object to a second context name within said first context object;

means for binding a desired first object to a first object name within said second context object;

means for requesting said desired first object for a client using a path name comprised of said second context name and said first object name and a desired set of access rights; and means for resolving said request for said desired first object by resolving said second context name to receive a representation of said second context object located in said second name server, and then assuring said second name server that a name resolution from said first name server to said second name server is secure, and then resolving said first object name within said second context object to receive a duplicate of said desired object that encapsulates the first encapsulated principal identifier and the desired access rights.

6. The apparatus of claim 5, wherein said means for assuring said second name server that a name resolution from said first name server to said second name server is secure comprises:

means for comparing said first encapsulated principal identifier in said first context object with said second encapsulated principal identifier in said second context object; and means for granting assurance if said first encapsulated principal identifier and said second encapsulated principal identifier are equal.

7. The apparatus of claim 5, wherein said means for assuring said second name server that a name resolution from said first name server to said second name server is secure comprises means for providing a special relationship between said first name server and said second name server such that said first name server trusts said second name server.

8. The apparatus of claim 5, wherein said means for assuring said second name server that a name resolution from said first name server to said second name server is secure comprises:

means for raising a "cannot proceed" exception with said client;

means for returning a powerless duplicate of said second context object and said first object name to said client; and means for authenticating said client with said second name server.

9. In an object-oriented system, said object-oriented system having a first name server having a first context object with a first encapsulated principal identifier, a second name server having a second context object with a second encapsulated principal identifier, a method for providing a secure naming system comprising the steps of:

binding said second context object to a second context name within said first context object;

binding a desired first object to a first object name within said second context object;

sending an object request from a client to said first context object for said desired first object using a path name comprised of said second context name and said first object name and a desired set of access rights; and resolving said object request for said desired first object by performing a series of steps comprising resolving said second context name within said first context object to receive a representation of said second context object located in said second name server, assuring said second name server that a name resolution from said first name server to said second name server is secure, resolving said first object name within said second context object to receive a duplicate of said desired object that encapsulates the first encapsulated principal identifier and the desired access rights.

10. The method of claim 9, wherein said step of assuring said second name server comprises the steps of:

comparing said first encapsulated principal in said first context object with said second encapsulated principal in said second context object; and granting security assurance if said first encapsulated principal and said second encapsulated principal are equal.

11. The method of claim 9, wherein said step of assuring said second name server comprises the step of providing a special relationship between said first name server and said second name server such that said second name server trusts said first name server.

12. The method of claim 9, wherein said step of assuring said second name server comprises the steps of:

raising a "cannot proceed" exception with said client;

returning a powerless duplicate of said second context object and said first object name to said client; and authenticating said client with said second name server.

\* \* \* \* \*

UNITED STATES PATENT AND TRADEMARK OFFICE
CERTIFICATE OF CORRECTION

PATENT NO. : 5,577,252
DATED : November 19, 1996
INVENTOR(S) : Nelson et al.

It is certified that error appears in the above-identified patent and that said Letters Patent is hereby corrected as shown below:

Title page,
Item [56], References Cited, OTHER PUBLICATIONS, insert
-- Dixon G.N., et al., The Treatment of Persistent Objects in Arjuna, The Computer Journal, 32 (1989) August, no. 4, pp. 323-332.
Campbell, Roy H., et al., Considerations of Persistence and Security in Choices, an Object-Oriented Operating System, Security and Persistence: Proceedings of the Int'l Workshop on Computer Architectures to Support Security and Persistence of Information, 8-11 May 1990, Bremen, W. Germany, pp. 289-300.
Object Data Manager, IBM Technical Disclosure Bulletin, March 1990, USA, Vol 32, pp.55-57. --.

Signed and Sealed this

Twenty-fourth Day of December, 2002

JAMES E. ROGAN
*Director of the United States Patent and Trademark Office*